United States Patent
Bi et al.

(10) Patent No.: US 9,219,902 B2
(45) Date of Patent: Dec. 22, 2015

(54) 3D TO STEREOSCOPIC 3D CONVERSION

(75) Inventors: Ning Bi, San Diego, CA (US); Xuerui Zhang, San Diego, CA (US); Jaimin Rohitkumar Bhise, San Diego, CA (US); Jianfeng Ren, Jiangsu (CN); Manish Madhukar Sirdeshmukh, San Diego, CA (US); Qing Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 766 days.

(21) Appl. No.: 13/418,206

(22) Filed: Mar. 12, 2012

(65) Prior Publication Data

US 2012/0236002 A1 Sep. 20, 2012

Related U.S. Application Data (60) Provisional application No. 61/452,289, filed on Mar. 14, 2011, provisional application No. 61/474,638, filed on Apr. 12, 2011.

(51) Int. Cl.
*H04N 13/02* (2006.01)
*H04N 13/00* (2006.01)
(Continued)

(52) U.S. Cl.
CPC .......... *H04N 13/0018* (2013.01); *G06T 15/005* (2013.01); *G06T 15/10* (2013.01); *G06T 15/30* (2013.01); *H04N 13/0275* (2013.01); *H04N 13/0285* (2013.01)

(58) Field of Classification Search
CPC ....... G06T 15/005; G06T 15/10; G06T 15/30; H04N 13/0018; H04N 13/0275; H04N 13/0285
See application file for complete search history.

(56) References Cited

U.S. PATENT DOCUMENTS 6,104,405 A * 8/2000 Idaszak ................... G06T 15/20
345/427
6,496,183 B1 * 12/2002 Bar-Nahum .......... G06T 15/005
345/419

(Continued)

FOREIGN PATENT DOCUMENTS

EP 1953702 A2 8/2008
JP 11073523 A 3/1999

(Continued)

OTHER PUBLICATIONS

Akka, "Converting Existing Applications to Support High Quality Stereoscopy," Proceedings of SPIE Conference on Stereoscopic Displays, vol. 3639, Jan. 1999, 10 pp.

(Continued)

*Primary Examiner* — Thai Tran
*Assistant Examiner* — Stephen Smith
(74) *Attorney, Agent, or Firm* — Shumaker & Sieffert, P.A.

(57) ABSTRACT

This disclosure describes techniques for modifying application program interface (API) calls in a manner that can cause a device to render native three dimensional (3D) graphics content in stereoscopic 3D. The techniques of this disclosure can be implemented in a manner where API calls themselves are modified, but the API itself and the GPU hardware are not modified. The techniques of the present disclosure include using the same viewing frustum defined by the original content to generate a left-eye image and a right-eye image and shifting the viewport offset of the left-eye image and the right-eye image.

28 Claims, 6 Drawing Sheets

(51) Int. Cl.
  *G06T 15/00* (2011.01)
  *G06T 15/10* (2011.01)
  *G06T 15/30* (2011.01)

(56) References Cited

U.S. PATENT DOCUMENTS

| | | | |
|---|---|---|---|
| 6,798,409 B2 | 9/2004 | Thomas et al. | |
| 6,888,540 B2* | 5/2005 | Allen | G02B 27/2214 345/419 |
| 2002/0154214 A1 | 10/2002 | Scallie et al. | |
| 2004/0085310 A1 | 5/2004 | Snuffer | |
| 2004/0179262 A1 | 9/2004 | Harman et al. | |
| 2004/0212612 A1* | 10/2004 | Epstein | G06T 15/10 345/419 |
| 2008/0007559 A1 | 1/2008 | Kalaiah | H04N 13/0275 345/501 |
| 2008/0018732 A1 | 1/2008 | Moller | |
| 2008/0062197 A1* | 3/2008 | Bi | G06T 15/30 345/621 |
| 2008/0165181 A1 | 7/2008 | Wang et al. | |
| 2008/0309660 A1* | 12/2008 | Bertolami | A63F 13/10 345/419 |
| 2009/0002380 A1 | 1/2009 | Langyel et al. | |
| 2009/0231329 A1* | 9/2009 | Swaminathan | H04N 13/0275 345/419 |
| 2009/0231331 A1 | 9/2009 | Holland | |
| 2010/0245356 A1 | 9/2010 | Gateau | |
| 2011/0063285 A1* | 3/2011 | Hoover | G06T 15/005 345/419 |
| 2011/0164034 A1* | 7/2011 | Bennett | G06F 3/14 345/419 |
| 2011/0210966 A1* | 9/2011 | Lee | H04N 13/0275 345/419 |
| 2011/0310982 A1* | 12/2011 | Yang | H04N 13/0003 375/240.26 |
| 2012/0114200 A1* | 5/2012 | Akhriev | G06T 15/10 382/118 |

FOREIGN PATENT DOCUMENTS

| | | |
|---|---|---|
| JP | 2002519792 A | 7/2002 |
| JP | 2007141156 A | 6/2007 |
| JP | 2007538427 A | 12/2007 |
| JP | 2009064355 A | 3/2009 |
| JP | 2009064356 A | 3/2009 |
| JP | 2009223889 A | 10/2009 |
| JP | 4836814 B2 | 12/2011 |
| WO | 0000934 A2 | 1/2000 |
| WO | 2004049262 A1 | 6/2004 |
| WO | 2005112474 A2 | 11/2005 |
| WO | 2007017834 A2 | 2/2007 |
| WO | 2008086049 | 7/2008 |
| WO | WO2010139984 A1 | 12/2010 |
| WO | 2011013030 A1 | 2/2011 |

OTHER PUBLICATIONS

Blythe, "Rise of the Graphics Processor," Proceedings of the IEEE, vol. 96, No. 5, May 2008, 18 pp.
Blythe, "The Direct3D 10 System", Proceeding SIGGRAPH '06 ACM SIGGRAPH 2006 Papers, Jul. 30, 2006-Aug. 3, 2006, 11 pp.
Carrozzo et al., "Geometric transformations for displaying virtual objects on stereoscopic devices", Computers and Graphics, vol. 21, No. 3, May 1997, 6 pp.
Hitchner et al., "Viewing and Projections", Lecture Notes, Jan. 1, 2005, 60 slides, The University of Auckland Retrieved from the Internet: URL:http://www.cs.auckland.ac.nz/compsci372s1c/yenLectures/ViewingAndProjection4up.pdf [retrieved on Jun. 12, 2012].
International Search Report and Written Opinion—PCT/US2012/028941—ISA/EPO—Jun. 20, 2012—14 pp.
Kilgariffe et al., "The GeForce 6 Series GPU Architecture", Jan. 2005, GPU Gems—Programming Techniques for High-Performance Graphics and General-Purpose Computation, 22 pp.
Montry et al., "The Geforce 6800", IEEE Micro, IEEE Service Center, vol. 25, No. 2, Mar. 2005, 11 pp.
Shreiner et al., "Homogeneous Coordinates and Transformation Matrices" OpenGL Architecture Review Board: OpenGL programming Guide, Fourth Edition, The Official Guide to Learning OpenGL, version 1.4, Appendix F, Nov. 13, 2003, 8 pp.
Reply to Written Opinion dated Jun. 20, 2012, from international application No. PCT/US2012/028941, filed Jan. 14, 2013, 4 pp.
Written Opinion of the International Preliminary Examining Authority—PCT/US2012/028941—European Patent Office, Mar. 11, 2013, 8 pp.
International Preliminary Report on Patentability—PCT/US2012/028941, The International Bureau of WIPO—Geneva, Switzerland, Jul. 16, 2013, 13 pp.
NVIDIA Corporation, "Drivers for Windows, NVIDIA 3D Stereo User's Guide (for Detonator XP)," Revision 2.0, Nov. 8, 2001, 51 pp.
NVIDIA Corporation, "NVIDA 3D Vision Automatic, Best Practices Guide," BPG-05394-001, Version 01, Jul. 2010, 31 pp.
U.S. Appl. No. 13/350,467 by Ning Bi, filed Jan. 13, 2012.

* cited by examiner

3D TO STEREOSCOPIC 3D CONVERSION

This application claims the benefit of U.S. Provisional Application No. 61/452,289, filed 14 Mar. 2011, and U.S. Provisional Application No. 61/474,638, filed 12 Apr. 2011, the contents of each is hereby incorporated by reference in its respective entirety.

TECHNICAL FIELD

This disclosure relates to graphics data processing, and more particularly, to graphics data processing for stereoscopic view.

BACKGROUND

Stereoscopic view refers to a perceived image that appears to encompass a 3-dimensional (3D) volume. To generate the stereoscopic view, a device displays two images on a 2-dimensional (2D) area of a display. These two images include substantially similar content, but with slight displacement along the horizontal axis of one or more corresponding pixels in the two images. The simultaneous viewing of these two images, on a 2D area, causes a viewer to perceive an image that is popped out of or pushed into the 2D display that is displaying the two images. In this way, although the two images are displayed on the 2D area of the display, the viewer perceives an image that appears to encompass the 3D volume.

The two images of the stereoscopic view are referred to as a left-eye image and a right-eye image, respectively. The left-eye image is viewable by the left eye of the viewer, and the right-eye image is not viewable by the left eye of the viewer. Similarly, the right-eye image is viewable by the right eye of the viewer, and the left-eye image is not viewable by the right eye of the viewer. For example, the viewer may wear specialized glasses, where the left lens of the glasses blocks the right-eye image and passes through the left-eye image, and the right lens of the glasses blocks the left-eye image and passes through the right-eye image.

Because the left-eye and right-eye images include substantially similar content with slight displacement along the horizontal axis, but are not simultaneously viewable by both eyes of the viewer (e.g., because of the specialized glasses), the brain of the viewer resolves the slight displacement between corresponding pixels by commingles the two images. The commingling causes the viewer to perceive the two images as an image with 3D volume.

SUMMARY

This disclosure describes techniques for modifying application program interface (API) calls in a manner that can cause a device to render three dimensional (3D) graphics content in stereoscopic 3D. The techniques of this disclosure can be implemented in a manner where API calls themselves are modified, but the API itself and the GPU hardware are not modified.

In one example, a method of converting non-stereoscopic 3D content to 3D content includes intercepting an application program interface (API) call; determining from the API call, a model view projection matrix for the non-stereoscopic 3D content; modifying the model view projection matrix to generate a modified model view projection matrix; based on the modified model view projection matrix, generating left view clipping coordinates; based on the modified model view projection matrix, generating right view clipping coordinates; based on the left view clipping coordinates, generating a left view; based on the right view clipping coordinates, generating a right view; and, based on the left view and the right view, rendering an 3D image.

In another example, a device includes a memory storing instructions, a graphics processing unit (GPU) and, a processor. The processor is operable to, upon execution of the instructions, intercept an application program interface (API) call; determine from the API call, a model view projection matrix for non-stereoscopic 3D content; modify the model view projection matrix to generate a modified model view projection matrix; cause the GPU to generate left view clipping coordinates based on the modified model view projection matrix; cause the GPU to generate right view clipping coordinates based on the modified model view projection matrix; cause the GPU to generate a left view based on the left view clipping coordinates; cause the GPU to generate a right view based on the right view clipping coordinates; and, cause the GPU to render an 3D image based on the left view and the right view.

In another example, an apparatus for converting non-stereoscopic 3D content to 3D content includes means for intercepting an application program interface (API) call; means for determining from the API call, a model view projection matrix for the non-stereoscopic 3D content; means for modifying the model view projection matrix to generate a modified model view projection matrix; means for generating left view clipping coordinates based on the modified model view projection matrix; means for generating right view clipping coordinates based on the modified model view projection matrix; means for generating a left view based on the left view clipping coordinates; means for generating a right view based on the right view clipping coordinates; and, means for rendering an 3D image based on the left view and the right view.

In another example, a computer-readable storage medium stores instructions that when executed cause one or more processors to intercept an application program interface (API) call; determine from the API call, a model view projection matrix for the non-stereoscopic 3D content; modify the model view projection matrix to generate a modified model view projection matrix; based on the modified model view projection matrix, generate left view clipping coordinates; based on the modified model view projection matrix, generate right view clipping coordinates; based on the left view clipping coordinates, generate a left view; based on the right view clipping coordinates, generate a right view; and, based on the left view and the right view, render an 3D image.

The details of one or more aspects of the disclosure are set forth in the accompanying drawings and the description below. Other features, objects, and advantages of the disclosure will be apparent from the description and drawings, and from the claims.

DETAILED DESCRIPTION

The example techniques described in this disclosure are directed to rendering stereoscopic 3-dimensional (S3D) graphics during execution or run time. In conventional 3D graphics rendering, a graphics processing unit (GPU) generates 3D graphics from a single point of view (e.g., mono view). This single point of view may mean a single image that is viewable by both the right eye and left eye of a viewer.

S3D graphics differs from 3D graphics in that S3D graphics generate a stereoscopic view. The term stereoscopic view refers to images that are generated from a binocular point of view. In a binocular point of view, there may be two images, where one image is viewable by one of the eyes and not the other, and vice-versa. For example, when a viewer wears binoculars, the light that enters through the left lens for the binoculars is viewable by the left eye, and not the right eye, and vice-versa. The binocular point of view may be referred to as stereoscopic view.

For example, in S3D graphics the GPU may generate an image for the left-eye and another image for the right-eye, i.e., a stereoscopic view. The term stereoscopic view refers to two images (e.g., left-eye image and right-eye image) that are each displayed on the display, whereas mono view refers to a single image that is displayed on the display. The combination of the left-eye image and the right-eye image may appear to a viewer as if the image is popping out of or pushing into the display that is displaying the images. This may result in a more realistic and richer viewing experience.

In this disclosure, the concept of an S3D image (e.g., stereoscopic view) and a 3D image (e.g., mono view) should not be confused. A 3D image is an image that is constrained to a 2-dimensional (2D) area of a display. For instance, objects within a 3D image may appear further away or closer than other objects within the 3D image. However, all of these objects are limited to the 2D area of the display. An S3D image is a perceived image resulting from a brain of a viewer combining the right-eye and left-eye images. The resulting image (i.e., the S3D image) appears to not be constrained to the 2D area of the display. Rather, the S3D image appears to encompass a 3D volume, where the image appears to pop out of or push into the display. For instance, objects within the S3D image appear further away or closer than other objects within a 3D volume, and not a 2D area, as is the case with 3D images.

The right-eye and left-eye images, that together form the S3D image, may be 3D images. It is the brain of the viewer that causes the viewer to perceive the S3D image when the brain combines the 3D right-eye image and the 3D left-eye image. The content of the right-eye image and left-eye images may be substantially similar to the content of the single 3D image. This disclosure describes techniques for converting 3D graphics content to S3D content. By using the techniques of this disclosure, much existing 3D graphics content can be converted to 3D graphics content and displayed on a stereoscopic display.

This disclosure also describes techniques for modifying application program interface (API) calls in a manner that can cause a GPU to perform the described 3D-to-S3D conversion. The techniques of this disclosure can be implemented in a manner where only the API calls themselves are modified, as opposed to the API or the GPU being modified.

To generate S3D content from native 3D content, the techniques of this disclosure include techniques for 3D-to-S3D conversion. The techniques include software for intercepting selected API calls from a 3D application to a 3D graphics API. The intercepted API calls can be modified in a manner that causes a system for generating graphics to create binocular views that can be displayed on a S3D display in run time, thus creating a S3D effect for users viewing the rendered content. Two images, a left-eye image and a right-eye image, can be rendered by the same graphics pipeline, based on an analysis of the native 3D content. The two images can be generated using different setups for viewing locations and/or directions. A system implementing the techniques of this disclosure can be located right above a graphics API, such as an OpenGL ES API used in mobile devices, enabling API calls from a 3D graphics application to be intercepted. In some implementations, the 3D-to-S3D conversion system can be implemented only using software and without requiring changes to GPU hardware, graphics driver code, or to 3D graphics application content. The techniques of this disclosure can be applied with OpenGL, OpenGL ES, and other graphics APIs.

Techniques for converting native 3D content to S3D content currently exist in the art, but many of these techniques either have limited application because they require knowledge of information not always known from the API calls or result in poor S3D image quality because they make assumptions about the S3D viewing space that are not always accurate. This disclosure describes 3D-to-S3D conversion techniques that, in some instances, are both widely usable and result in good image quality.

Figure 1:
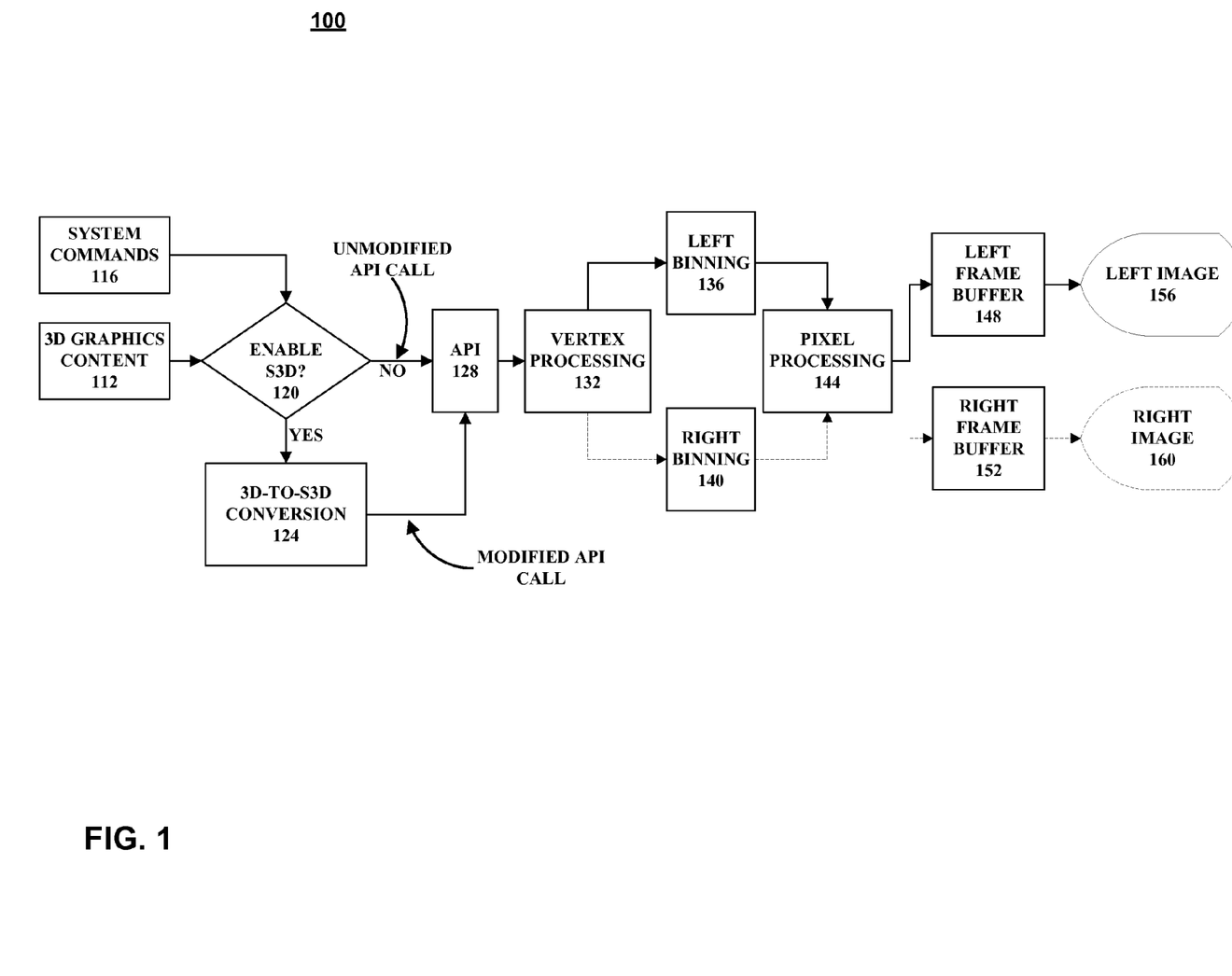
FIG. 1 is a block diagram illustrating the function of an example system that may implement one or more example techniques described in this disclosure.

FIG. 1 is a functional diagram of an example 3D-to-S3D conversion system 100 that can implement the techniques of this disclosure. System 100 of FIG. 1 is intended to provide a functional overview. System 100 includes 3D graphics content 112, system commands 116 for enabling 3D-to-3D conversion, an enable S3D module 120, a 3D-to-S3D conversion module 124, an API 128, a vertex processing module 132, a left binning unit 136, a right binning unit 140, a pixel processing module 144, a left frame buffer 148, a right frame buffer 152, a left image 156, and a right image 160. Portions of system 100 will be explained in more detail, and with reference to additional hardware and software components, later in this disclosure. Additionally, as will be explained in more detail below, certain portions of system 100, such as vertex processing module 132, left binning unit 136, right binning unit 140, and pixel processing module 144 may be implemented as part of a GPU.

3D graphics content 112 and system commands 116 can be stored on a system memory in the form of computer code. 3D graphics content 112 can include, for example, graphics commands used for generating 3D images. When using an OpenGL ES API, for example, the graphics commands can include glDraw commands such as glDrawArrays( ) and glDrawElements( ), which will be discussed in more detail below.

3D-to-S3D conversion can be enabled by system commands 116. System commands 116 may, for example, represent a user-inputted command or may be a command contained within an application being executed by an application processor. When 3D-to-S3D in not enabled, then 3D graphics content 112 can be processed in the normal manner to generate a 3D image. In such instances, the portions of system 100 shown in dotted lines may not be utilized or may not be present, while the other portions of system 100 process a single mono view image, as opposed to a left image and a right image. When 3D-to-S3D conversion is not enabled (see e.g. 120, no), unmodified API calls are sent to API 128.

Unmodified API calls generally refer to API calls from 3D graphics content 112 that are sent to API 128 in their original form.

When 3D-to-S3D conversion is enabled (see. e.g. 120, yes), 3D-to-S3D conversion module 124 can intercept API calls of graphics content 112 and modify the API calls in a manner that will cause them to produce a left-eye view and a right-eye view as opposed to a single mono view. The modified API calls produced by 3D-to-S3D conversion module 124 can then be taken by API 128 to cause a GPU to render both a left-eye image and a right-eye image. The modified API calls can be executed by vertex processing module 132, left binning unit 136, right binning unit 140, and pixel processing module 144 to produce a left-eye image to be stored in left frame buffer 148 and a right-eye image to be stored in right frame buffer 152. In the example of system 100, 3D-to-S3D conversion module 124 represents an application running on an application processor that is configured to intercept API calls and perform modifications to those API calls. The modifications to the API calls enabled 3D graphics content to be rendered as S3D graphics content by a GPU.

In a typical 3D graphics pipelines, 3D graphics content is first in the form of primitive data that describes geometrics primitives. For both a left image and a right image, vertex processing unit 132 can generate a set of pixel locations in a 2D display plane based on the geometric primitive data. Left binning unit 136 can assemble geometric primitives associated with the left image on a tile-by-tile basis, where a tile corresponds to a portion of the left image. Similarly, right binning unit 140 can assemble geometric primitives associated with the right image on a tile-by-tile basis. For each of the tiles of the left image and the tiles of the right image, pixel processing unit 144 can compute attributes for the pixels determined by vertex processing unit 132. Pixel processing module 144 can output a left image (e.g. left image 156) to left frame buffer 148 and can output a right image (e.g. right image 160) to right frame buffer 152. Left image 156 and right image 160 can be displayed simultaneously on a S3D display to generate an S3D image. In this manner, even though 3D graphics content 112 does not include S3D graphics content, the output of system 100 can still be an S3D image.

The functions performed by vertex processing module 132, left binning unit 136, right binning unit 140, and pixel processing module 144 will be described in more detail below with reference to FIG. 2. In some configurations, a system may include various hardware components that are dedicated to right-eye images and hardware components that are dedicated to left-eye images. In other implementations, however, the same components may be used for both right and left-eye images. In system 100 of FIG. 1, for example, vertex processing module 132 and pixel processing module 144 can be implemented in software, while left binning unit 136, right binning unit 140, left frame buffer 148, and right frame buffer 150 are implemented in hardware. In other configurations, however, vertex processing module 132 and pixel processing module 144 might be implemented in hardware, or left frame buffer 148 and right frame buffer 152 might be replaced by a single frame buffer that holds both left and right images. Additionally, as mentioned before, system 100 is merely meant to provide a functional overview of a system that can implement the techniques of this disclosure, and some aspects of the graphics pipeline have been simplified or omitted for purposes of explanation.

Figure 2:
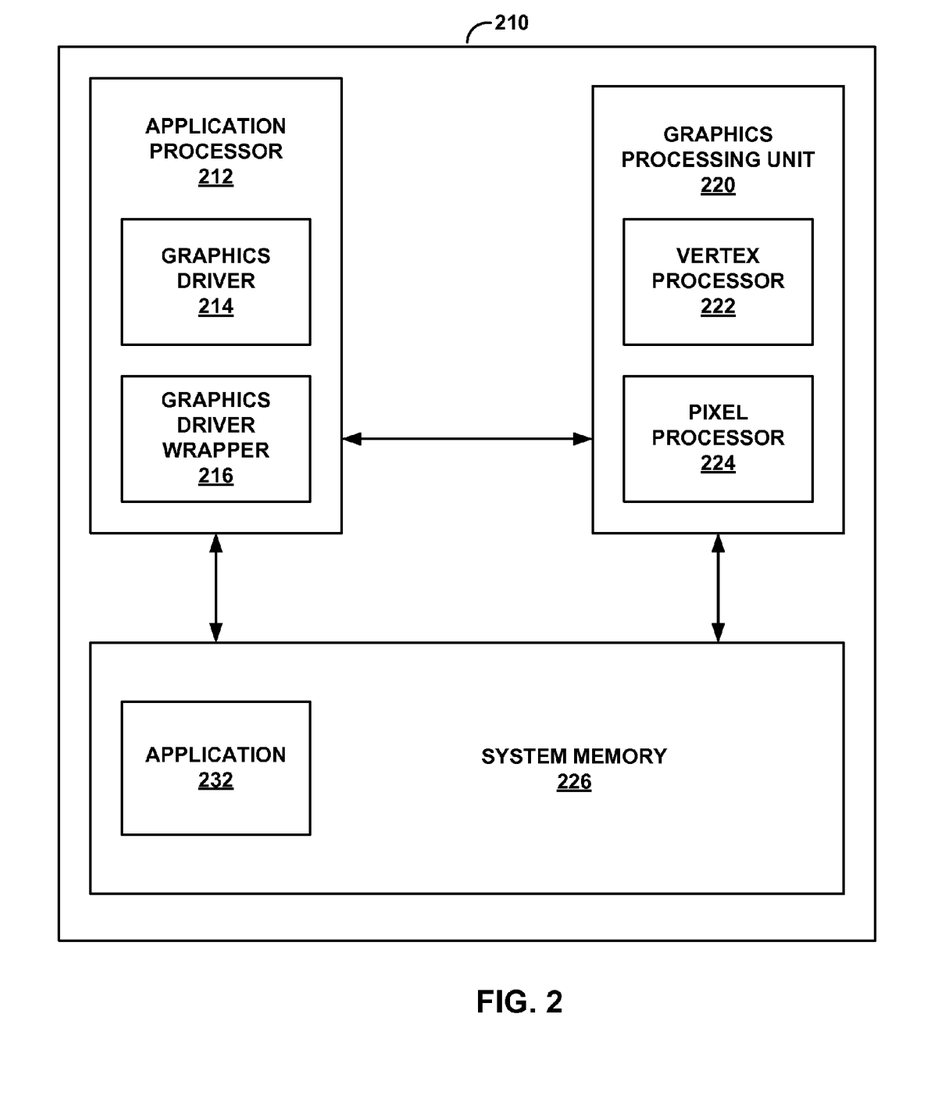
FIG. 2 is a block diagram illustrating an example of a device that may implement one or more example techniques described in this disclosure.

FIG. 2 is a block diagram illustrating an example of a device that may implement one or more example techniques described in this disclosure. For instance, FIG. 2 illustrates a device 210. Examples of device 210 include, but are not limited to, mobile wireless telephones, personal digital assistants (PDAs), video gaming consoles that include video displays, mobile video conferencing units, laptop computers, desktop computers, television set-top boxes, and the like. As illustrated in FIG. 2, device 210 may include application processor 212, graphics processing unit (GPU) 220, and system memory 226. Device 210 may include components in addition to those illustrated in FIG. 2. Although portions of this disclosure will generally describe 3D-to-S3D conversion techniques with reference to a system that utilizes both an application processor and a GPU, the techniques described in this disclosure are not necessarily limited to such systems. For example, some of the 3D-to-S3D conversion techniques of this disclosure may, in some instances, be performed solely by an application processor without a GPU.

Application processor 212 may be the central processing unit (CPU) of device 210. GPU 220 may be a processing unit operable to output graphics data for presentation on a display. Examples of application processor 212 and GPU 220 include, but are not limited to, a digital signal processor (DSP), a general purpose microprocessor, application specific integrated circuit (ASIC), field programmable logic array (FPGA), or other equivalent integrated or discrete logic circuitry.

System memory 226 may be an example of a computer-readable storage medium. For example, system memory 226 may store instructions that cause application processor 212 and GPU 220 to perform functions ascribed to each in this disclosure. In this way, system memory 226 may be considered as a computer-readable storage medium comprising instructions that cause one or more processors, e.g., application processor 212 or GPU 220, to perform various functions.

Examples of system memory 226 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 226 may, in some examples, be considered as a non-transitory storage medium. The term "non-transitory" may indicate that the storage medium is not embodied in a carrier wave or a propagated signal. However, the term "non-transitory" should not be interpreted to mean that system memory 226 is non-movable. As one example, system memory 226 may be removed from device 210, and moved to another device. As another example, a storage device, substantially similar to system memory 226, may be inserted into device 210. In certain examples, a non-transitory storage medium may store data that can, over time, change (e.g., in RAM).

GPU 220 shows an example of a GPU with a fixed function pipeline, although the techniques of this disclosure may also be implemented using GPUs that include programmable elements. GPU 220 includes vertex processor 222 and pixel processor 224. Vertex processor 222 may include hardware units that perform vertex processing functions, while pixel processor may include hardware units that perform pixel processing functions. In other words, vertex processor 222 and pixel processor 224 may include hardware units with fixed functions and minimal functional flexibility. As mentioned previously, however, the techniques of this disclosure are not intended to be limited to GPUs with fixed function pipelines.

The example techniques described in this disclosure may utilize a software application being run by application processor to 212 to intercept API calls and modify the API calls to produce modified API calls. This software application is shown in FIG. 2 as graphics driver wrapper 216. Using the modified API calls, GPU 220 can render S3D graphics.

As discussed above, a stereoscopic view includes a left-eye image and a right-eye image. The left-eye image and the right-eye image include substantially similar image content as a mono view image; however, one or more corresponding pixels of the left-eye and right-eye images may be displaced along on the horizontal axis relative to one another. For example, imagine that the right-eye image is placed on top of the left-eye image. In this case, all of the content in the right-eye image may not line up perfectly with the identical content in the left-eye image. Rather, one or more objects in the right-eye may be to the left or to the right of the identical objects in the left-eye image.

The left-eye image is viewable by the left eye of the viewer, and the right-eye image is blocked from the left eye of the viewer. The right-eye image is viewable by the right eye of the viewer, and the left-eye image is blocked from the right eye of the viewer. In some examples, the viewer may wear specialized glasses that block the left-eye image from being viewable by the right eye, and the right-eye image from being viewable by the left eye. However, aspects of this disclosure do not necessarily require a viewer to wear specialized glasses. For example, some displays do not require the viewer to wear specialized glasses to experience stereoscopic view. Techniques of this disclosure may be extended to such situations.

GPU 220 may generate the graphics data for the left-eye image and the right-eye image such that when the viewer views both the left-eye image and the right-eye image at the same time the brain of the viewer causes the viewer to perceive an image that pops out of the display or pushes into the display displaying the two images (e.g., appears to be ahead of or behind the display). This popping out or pushing in is due to the brain of the viewer resolving the horizontal discrepancies in the two images of the stereoscopic view with substantially similar content.

As an example, application processor 212 may execute one or more applications, such as application 232, stored in system memory 226. Examples of application 232 include, but are not limited to, web browsers, e-mail applications, spreadsheets, video games, or other applications that generate viewable objects for display. For instance, application 232 may be a video game that when executed outputs 3D graphical content that is displayed on a display.

Application 232 may be designed by a developer for mono view. For example, application 232, upon execution, may generate 3D graphics content, where the 3D graphics content is constrained to the 2D area of the display. Application 232, upon execution on application processor 212, may divide the generated 3D graphics content into primitives such as triangles, rectangles, or other types of polygons. Each of these primitives can be used to render pixels that are to be displayed on the display. Application 232, upon execution on application processor 212, may also render pixel values for each of the vertices of the primitives. For example, the values may include 3D coordinates of the vertices, color values of the vertices, and transparency values of the vertices. The values need not include all of the above example components in every aspect of this disclosure.

Application processor 212 may then forward the pixel values for the vertices to GPU 220 for further processing. For example, application processor 212 may include graphics driver 214, which may be software executing on application processor 212. Graphics driver 214 may be designed to transmit commands to GPU 220, and in response, GPU 220 may perform functions in accordance with the received commands. For example, graphics driver 214 functions as an interface between GPU 220 and application processor 212. When application processor 212 issues a command to GPU 220, it is through graphics driver 214 that GPU 220 receives the command. For instance, application 232, executing on application processor 212, may instruct GPU 220 to perform a particular task. In this case, graphics driver 214 may receive the instruction from application 232 for the particular task, and may provide the instruction to GPU 220. In response, GPU 220 may perform the task.

In some examples, graphics driver 214 may be designed in accordance with a specific API. For example, graphics driver 214 may be designed according to the OpenGL or OpenGL ES (embedded system) APIs, which are APIs of the Khronos Group and their specifications are available publicly. However, the techniques of this disclosure may be extendable to Microsoft's DirectX system, such as DirectX 9, 10, or 11, or any other graphics system and APIs. For purposes of illustration, the techniques of this disclosure are described in the context where the API is the OpenGL EX 1.1 API. However, aspects of this disclosure are not so limited, and can be extended to other APIs or graphics systems.

To render the primitives received from application processor 212, GPU 220 may include one or more vertex processors such as vertex processor 222 and one or more pixel processors such as pixel processor 224 to generate the pixel values for the pixels of a display. GPU 220 may also include other elements not shown. The techniques of this disclosure are not limited to a specific GPU architecture. A developer may develop graphics applications in accordance with the capabilities of vertex processor 222 and pixel processor 224 and in accordance with an API, such as the OpenGL EX 1.1 API used in this disclosure for illustration purposes.

Application 232 may generate coordinates for the vertices of the primitives. These coordinates may be referred to as world coordinates, and may be specific to application 232. In other words, the coordinates of the vertices, as defined by application 232, may not necessarily be coordinates of the display upon which the primitives are displayed and may also possibly be coordinates for vertices that are outside of a viewable area. Vertex processor 222 may be designed to convert the world coordinates, which may be in 3D, into 2D coordinates of the display (e.g., display coordinates). To perform this function, vertex processor 222 may transform the world coordinates into eye coordinates, and then to clipping coordinates. For example, the output of vertex processor 222, when executed, may be the clipping coordinates of the vertices. The final display coordinates, e.g., the coordinates of the display, may be determined subsequently by pixel processor 224.

The clipping coordinates may define a view frustum. The view frustum may define the viewable area of the 3D graphics content. GPU 220 may utilize the view frustum to cull pixels which reside external to the view frustum. For example, a fixed-function unit of GPU 220 (such as pixel process 224) may cull pixels which reside external to the view frustum, as defined by the clipping coordinates generated by application 232.

The equation to calculate the clipping coordinates from the world coordinates may be:

$$Vclip=PRJ*Veye=PRJ*MVT*Vworld=MVP*Vworld \quad \text{(equation 1)}$$

where Vclip is the vertex clip coordinates, Veye is the vertex eye coordinates, Vworld is the vertex world coordinates provided by application 232, PRJ is a projection matrix, and MVT is a model view transformation matrix (or world view transformation matrix). In some examples, the PRJ and MVT matrices may be combined into a single matrix, which can be referred to as a model view projection matrix, or MVP as shown above in equation 1, where MVP=PRJ*MVT.

The projection matrix (PRJ) and model view, or world view, transformation matrix (MVT) may be defined by the API. The terms model view and world view may be used interchangeably. Vclip, Veye, and Vworld may include four components (e.g., x, y, z, and w coordinates). For example, Vclip, Veye, and Vworld may be represented as:

$$V_{clip} = \begin{bmatrix} x_{clip} \\ y_{clip} \\ z_{clip} \\ w_{clip} \end{bmatrix}, V_{eye} = \begin{bmatrix} x_{eye} \\ y_{eye} \\ z_{eye} \\ w_{eye} \end{bmatrix}, V_{world} = \begin{bmatrix} x_{world} \\ y_{world} \\ z_{world} \\ w_{world} \end{bmatrix} \quad \text{(equation 2)}$$

The OpenGL and OpenGL ES APIs define the PRJ matrix as:

$$PRJ = \begin{bmatrix} \frac{2z_{near}}{(R-L)} & 0 & \frac{R+L}{R-L} & 0 \\ 0 & \frac{2z_{near}}{T-B} & \frac{T+B}{T-B} & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix} \quad \text{(equation 3)}$$

where L and R specify the coordinates for the left and right vertical clipping planes, B and T specify the coordinates for the bottom and top horizontal clipping planes, and $z_{near}$ and $z_{far}$ specify the distances to the near and the far depth clipping planes. In this manner, L and R specify the width of the viewport, while B and T specify the height of the viewport. In the case of a symmetrical viewport, −L can equal R and −B can equal T.

In some examples, the clipping planes may be symmetrical. For example, −L may be equal to R, and −B may be equal to T. In these instances, the PRJ matrix may simplify to:

$$PRJ = \begin{bmatrix} \frac{2z_{near}}{(R-L)} & 0 & 0 & 0 \\ 0 & \frac{2z_{near}}{T-B} & 0 & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix} \quad \text{(equation 4)}$$

The OpenGL and OpenGL ES APIs define the MVT matrix as:

$$MVT = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix} \quad \text{(equation 5)}$$

All of the variables of the PRJ and MVT matrices may be defined by application 232 executing on application processor 212, and graphics driver 214 may provide these variables to vertex processor 222. As can be seen from equations 1, 4, and 5, with these variables, vertex processor 222 may determine the Vclip coordinates for each of the vertices. GPU 220 may utilize the clip coordinates for the vertices and perform further functionality to render an image for display. In this way, GPU 220 may generate a mono view for the 3D graphics content generated by application 232.

In one or more example techniques described in this disclosure, graphics driver wrapper 216, which may be software executing on application processor 212, may modify API calls that define the clipping coordinates for the mono view to define clipping coordinates for the stereoscopic view (e.g., clipping coordinates for the left-eye image and clipping coordinates for the right-eye image). Also, graphics driver wrapper 216, in addition to modifying API calls that define the clipping coordinates, may modify API calls that define the viewport for the mono view to define viewports for the stereoscopic view. For example, application 232 may define the size and location of the single image (e.g., mono view) on the display that displays the image. Graphics driver wrapper 216 may modify API calls that define the size and location of the single image to modified API calls that define the size and location of the left-eye image and the right-eye image (e.g., instructions for the viewport for the left-eye image and the viewport for the right-eye image). In this manner, graphics driver wrapper 216 may intercept a single API call for a mono view and generate modified API calls for both a left view and a right view.

As an example of how graphics driver wrapper 216 can modify an API call, graphics driver wrapper can intercept an API call with the variables for PRJ and MVT described above. As described above the variables for PRJ and MVT can be used by GPU 220 to render a mono 3D view with clipping coordinates Vclip. Graphics driver wrapper 216 can modify the API call to produce a left image with clipping coordinates $Vclip_{left\_eye}$ and a right image with clipping coordinates $Vclip_{right\_eye}$.

As indicated above in equation (1), Vclip=PRJ*Veye=PRJ*MVT*Vworld. The equation for Vclip may be modified to generate clipping coordinates for the left-eye and clipping coordinates for the right-eye. For example, the clipping coordinates for the left-eye and right-eye may be:

$$Vclip_{left\_eye} = PRJ*VT_{left\_eye}*V_{eye} = PRJ*VT_{left\_eye}*MVT*V_{world} \quad \text{(equation 6)}$$

$$Vclip_{right\_eye} = PRJ*VT_{right\_eye}*V_{eye} = PRJ*VT_{right\_eye}*MVT*V_{world} \quad \text{(equation 7)}$$

$VT_{left\_eye}$ and $VT_{right\_eye}$ may be 4×4 view transformation matrices that are based on an assumed distance of the left eye and right eye away from the mono view. For example, if the coordinates of the mono view are assumed to be (0, 0, 0), then the left eye may be considered to be located at (−D, 0, 0), and the right eye may be considered to be located at (D, 0, 0). In other words, the (0, 0, 0) location may be considered as being in the middle of the right eye and the left eye of the viewer. If the left eye is considered to be located −D away from the middle of the right eye and the left eye, and right eye is considered to be located +D away from the middle of the right eye and the left eye, then D indicates half of the distance between the right eye and left eye of the viewer.

The view transformation matrices for $VT_{left\_eye}$ and $VT_{right\_eye}$ may be defined as:

$$VT_{left\_eye} = \begin{bmatrix} 1 & 0 & 0 & D \\ 0 & 1 & 0 & 0 \\ 0 & 0 & 1 & 0 \\ 0 & 0 & 0 & 1 \end{bmatrix} \quad \text{(equation 8a)}$$

$$VT_{right\_eye} = \begin{bmatrix} 1 & 0 & 0 & -D \\ 0 & 1 & 0 & 0 \\ 0 & 0 & 1 & 0 \\ 0 & 0 & 0 & 1 \end{bmatrix} \quad \text{(equation 9a)}$$

$VT_{left\_eye}$ and $VT_{right\_eye}$ may be rewritten as a sum of two matrices. For example, $VT_{left\_eye}$ may be rewritten as:

$$VT_{left\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & D \\ 0 & 0 & 0 & 0 \\ 0 & 0 & 0 & 0 \\ 0 & 0 & 0 & 0 \end{bmatrix} \quad \text{(equation 8b)}$$

$VT_{right\_eye}$ may be rewritten as:

$$VT_{right\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & -D \\ 0 & 0 & 0 & 0 \\ 0 & 0 & 0 & 0 \\ 0 & 0 & 0 & 0 \end{bmatrix}. \quad \text{(equation 9b)}$$

By substituting the $VT_{left\_eye}$ matrix into the equation for $Vclip_{left\_eye}$ (equation 6), $Vclip_{left\_eye}$ equals:

$$Vclip_{left\_eye} = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld + \quad \text{(equation 10)}$$

$$PRJ * \begin{bmatrix} 0 & 0 & 0 & D \\ 0 & 0 & 0 & 0 \\ 0 & 0 & 0 & 0 \\ 0 & 0 & 0 & 0 \end{bmatrix} * MVT * Vworld$$

By substituting the $VT_{right\_eye}$ matrix into the equation for $Vclip_{right\_eye}$ (equation 7), $Vclip_{right\_eye}$ equals:

$$Vclip_{right\_eye} = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld + \quad \text{(equation 11)}$$

$$PRJ * \begin{bmatrix} 0 & 0 & 0 & -D \\ 0 & 0 & 0 & 0 \\ 0 & 0 & 0 & 0 \\ 0 & 0 & 0 & 0 \end{bmatrix} * MVT * Vworld$$

In both equations 10 and 11, e.g., for $Vclip_{left\_eye}$ and $Vclip_{right\_eye}$, $$PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld$$

can be simplified to PRJ*MVT*Vworld because $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

is a unity matrix and is equivalent to multiplying by one.

As describe above in equation 1, PRJ*MVT*Vworld equals MVP*Vworld. Therefore, the $Vclip_{left\_eye}$ and $Vclip_{right\_eye}$ equations (e.g., equations 10 and 11, respectively) can be rewritten as:

$$Vclip_{left\_eye} = \quad \text{(equation 12)}$$

$$MVP * Vworld + PRJ * \begin{bmatrix} 0 & 0 & 0 & D \\ 0 & 0 & 0 & 0 \\ 0 & 0 & 0 & 0 \\ 0 & 0 & 0 & 0 \end{bmatrix} * MVT * Vworld$$

and $$Vclip_{right\_eye} = \quad \text{(equation 13)}$$

$$MVP * Vworld + PRJ * \begin{bmatrix} 0 & 0 & 0 & -D \\ 0 & 0 & 0 & 0 \\ 0 & 0 & 0 & 0 \\ 0 & 0 & 0 & 0 \end{bmatrix} * MVT * Vworld$$

By substituting the matrices for the PRJ (equation 3 or 4) and MVT (equation 5), and performing the matrix multiplication of equation 10, the equation for $Vclip_{left\_eye}$ may simplify to:

$$Vclip_{left\_eye} = \quad \text{(equation 14)}$$

$$MVP * Vworld + \begin{bmatrix} 0 & 0 & 0 & \frac{z_{near}}{(R-L)/2} * D \\ 0 & 0 & 0 & 0 \\ 0 & 0 & 0 & 0 \\ 0 & 0 & 0 & 0 \end{bmatrix} * Vworld$$

and more specifically to:

$$Vclip_{left\_eye} = \left( MVP + \begin{bmatrix} 0 & 0 & 0 & \frac{z_{near}}{(R-L)/2} * D \\ 0 & 0 & 0 & 0 \\ 0 & 0 & 0 & 0 \\ 0 & 0 & 0 & 0 \end{bmatrix} \right) * Vworld \quad \text{(equation 15)}$$

With similar substitutions to those for $Vclip_{left\_eye}$, the $Vclip_{right\_eye}$ equation may simplify to:

$$Vclip_{right\_eye} = \left( MVP - \begin{bmatrix} 0 & 0 & 0 & \frac{z_{near}}{(R-L)/2}*D \\ 0 & 0 & 0 & 0 \\ 0 & 0 & 0 & 0 \\ 0 & 0 & 0 & 0 \end{bmatrix} \right) * Vworld \quad \text{(equation 16)}$$

Using the left view transformation matrix ($VT_{left\_eye}$) described above, graphics driver wrapper 216 can modify an API call for a 3D image to produce a left-eye 3D image. Similarly, using the right view transformation matrix ($VT_{right\_eye}$) described above, graphics driver wrapper 216 can modify an API call for a 3D image to produce a right-eye 3D image. By simultaneously displaying the left-eye 3D image and the right-eye 3D image device 210 can render an S3D image.

The techniques described above in relation to equations 7-16 may be implemented by modifying API calls and without modification to GPU 220 or graphics driver 214. The techniques described in relation to equations 7-16 can be used for frustum-independent S3D rendering approximation. The techniques described are considered to be frustum independent because they do not require knowledge of the specific frustum parameters, such as the parameters that might be contained in a glFrustum( ) call. The techniques of the present disclosure include using the same viewing frustum defined by the original content when determining $Vclip_{left\_eye}$ and $Vclip_{right\_eye}$, but shifting the viewing location by D and –D for a right and left view, respectively. As a result of assuming parallel viewing directions for each eye, both the left view transformation and the right view transformation can be assumed to be close to an identity matrix with a shift in the horizontal direction as explained above in reference to equations 8a and 8b and equations 9a and 9b. A same projection matrix (e.g. PRJ, as described by either equations 3 or 4 above) can be determined and used for both the left eye and the right eye. To create an S3D image in accordance with the techniques of this disclosure, it is not necessary to know the parameters used to determine PRJ or the actual values for PRJ. Similarly, in accordance with the techniques of this disclosure, it is not necessary to know the parameters used to determine MVT or the actual values for MVT. No matter what parameters PRJ and MVT might contain, the parameters can be treated as one matrix, MVP. For creating an S3D image, a constant, $2*Z_{near}*D/(R-L)$, can be added to or subtracted from the element at the first row and fourth column of the MVP matrix. For any given 3D content, the value of $Z_{near}/(R-L)$ can be a constant. Thus, combining $Z_{near}/(R-L)$ with D still yields a constant. In some implementations, different constants can be tried until finding one that creates a correct and comfortable S3D effect. As only MVP is modified, the techniques of this disclosure can work either with or without receiving separate matrices for PRJ and MVT.

Figure 3A:
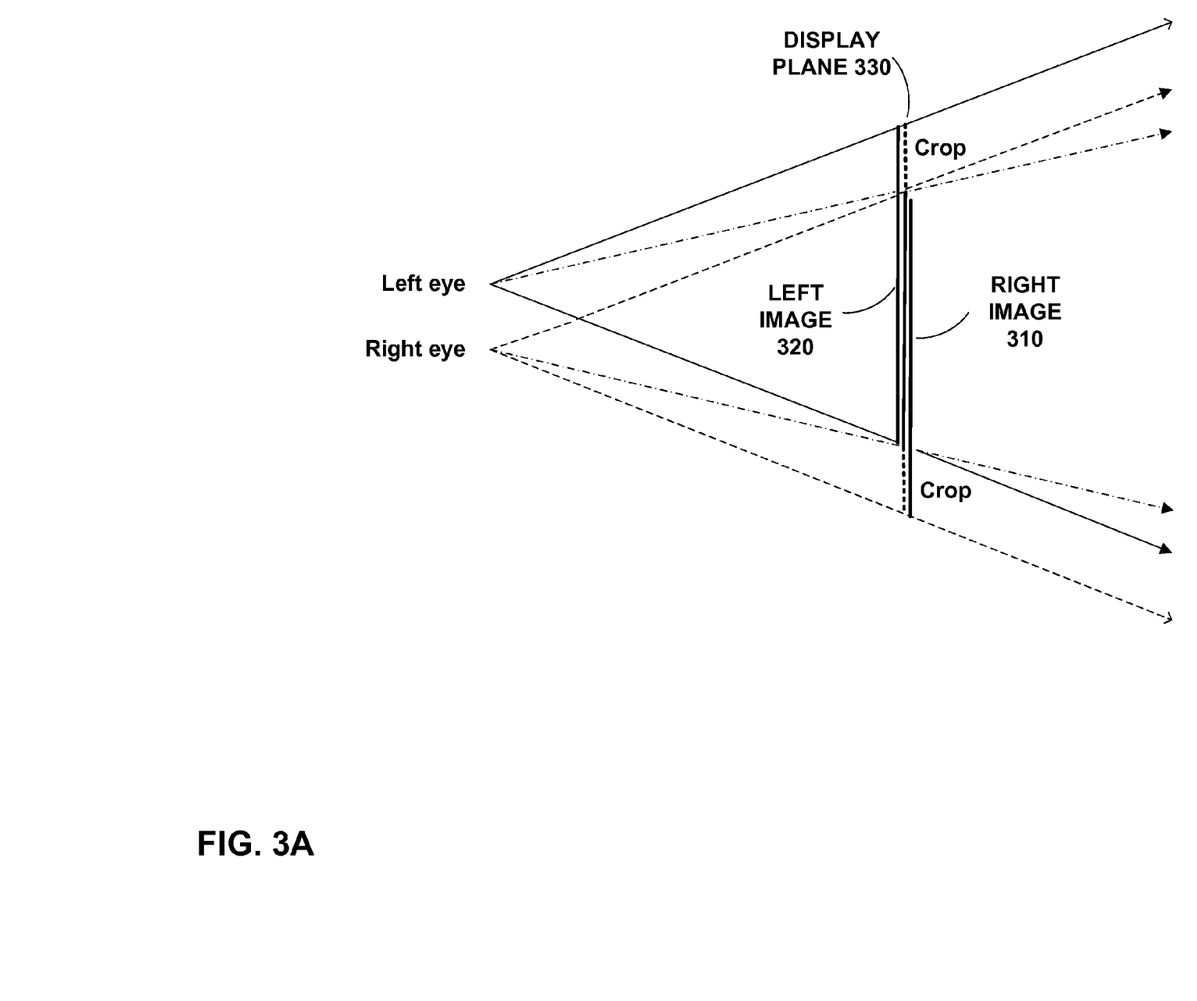
FIG. 3A shows a geometric representation of an 3D viewing area generated using techniques of this disclosure.

As shown in FIG. 3A, a portion of left image 320 and a portion of right image 310 might be cropped from the final S3D image when rendered on display plane 330. For clarity, FIG. 3A shows left image 320 slightly in front of display plane 330 and right image 310 slightly behind display plane 330. This, however, is merely to make FIG. 3A, as left image 320 and right image 310 are actually rendered on display plane 330. As the same viewing frustum is used to generate left image 320 and right image 310, the zero disparity plane (ZDP) of the S3D image may appear in front of display plane 330, causing a viewer to perceive a popped out effect. As will be explained in greater detail below, this effect can be reversed by shifting the viewport offset of the left-eye image and right-eye image.

In some implementations, the amount of shift applied to the viewport offsets of the left-eye image and right-eye image may be based on a user-entered parameter. The techniques of the present disclosure, which include generating left and right-eye views for an S3D image by using a symmetrical projection matrix, parallel viewing directions, and a shift of viewport offsets can, in some instances, render high quality S3D images in a run-time environment and may provide the viewer with an S3D experience that is a richer, fuller experience compared to viewing an image limited by the 2D area of the display.

Figure 3B:
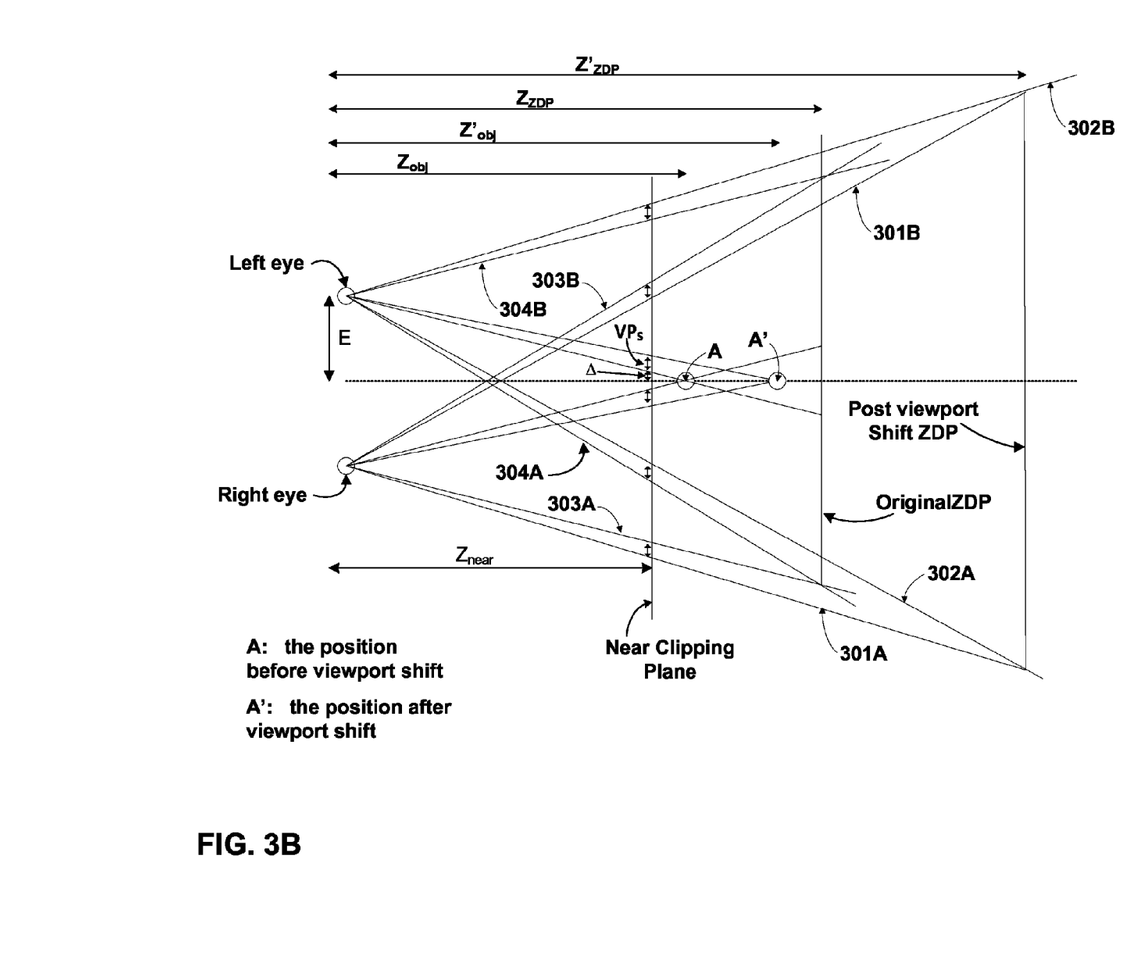
FIG. 3B shows a geometric representation of a viewport shift that can be performed according to techniques of this disclosure.

FIG. 3B shows an example of how an object (object A) can be shifted using the techniques described in this disclosure. FIG. 3B shows the diagram of the ZDP changes with corresponding viewport shifts. In FIG. 3B, lines 301A and 301B represent the right eye viewport prior to the viewport shift, and lines 303A and 303B represent the right eye viewport after the viewport shift. Lines 302A and 302B represent the left eye view port prior to the viewport shift, and lines 304A and 304B represent the view port after the viewport shift. The mathematical relationship of the depth change of viewports' shift can be derived as follows:

Δ indicates half of the projection viewport distance of the object which locates at point A,
$VP_s$ indicates the viewport shift amount for viewports,
E indicates the half distance of eye separation).

First based on the trigonometry of point A and A' and positions of the left eye and right eye are as follows:

$$\Delta = E * \frac{Z_{obj} - Z_{near}}{Z_{obj}} \quad \text{(equation 17)}$$

$$VP_s + \Delta = E * \frac{Z'_{obj} - Z_{near}}{Z'_{obj}} \quad \text{(equation 18)}$$

Combining equations 17 and 18 above, the object distance in viewer space after the viewport shift can be derived as follows:

$$Z'_{obj} = \frac{Z_{near} * Z_{obj} * E}{Z_{near} * E - Z_{obj} * VP_s} \quad \text{(equation 19)}$$

Based on equation 19 above, a new ZDP position in viewer space can be obtained based on equation 20:

$$Z'_{ZDP} = \frac{z_{near} * z_{ZDP} * E}{z_{near} * E - z_{ZDP} * VP_s} \quad \text{(equation 20)}$$

Figure 4:
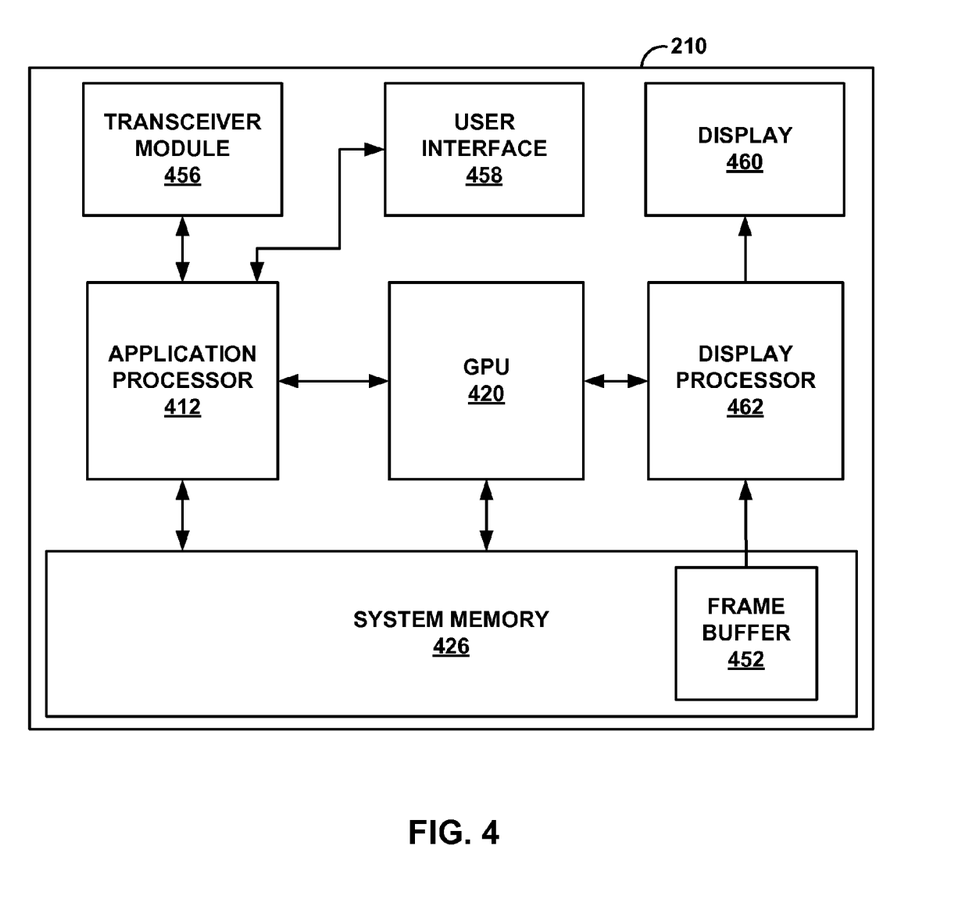
FIG. 4 is a block diagram illustrating the example device of FIG. 2 in further detail.

FIG. 4 is a block diagram illustrating the example device of FIG. 2 in further detail. For instance, FIG. 4 illustrates device 210 of FIG. 2 in further detail. For example, as indicated above, examples of device 210 include, but are not limited to, mobile wireless telephones, PDAs, video gaming consoles that include video displays, mobile video conferencing units, laptop computers, desktop computers, television set-top boxes, and the like.

As illustrated in FIG. 4, device 210 may include application processor 412, GPU 420, system memory 426, which includes frame buffer 452, transceiver module 456, user interface 458, display 460, and display processor 462. Application processor 412, GPU, and system memory 426 may be substantially similar to application processor 212, GPU 220, and system memory 226 of FIG. 2, respectively. For purposes of brevity, only the components that are shown in FIG. 4, but not shown in FIG. 2 are described in detail.

Device 210, as illustrated in FIG. 4, may include additional modules or units not shown in FIG. 4 for purposes of clarity. For example, device 210 may include a speaker and a microphone, neither of which are shown in FIG. 4, to effectuate telephonic communications in examples where device 210 is a mobile wireless telephone, or a speaker where device 210 is a media player. Furthermore, the various modules and units shown in device 210 may not be necessary in every example of device 210. For example, user interface 458 and display 460 may be external to device 210 in examples where device 210 is a desktop computer or other device that is equipped to interface with an external user interface or display.

Examples of user interface 458 include, but are not limited to, a trackball, a mouse, a keyboard, and other types of input devices. User interface 458 may also be a touch screen and may be incorporated as a part of display 460. Transceiver module 456 may include circuitry to allow wireless or wired communication between device 410 and another device or a network. Transceiver module 46 may include modulators, demodulators, amplifiers and other such circuitry for wired or wireless communication. Display 460 may comprise a liquid crystal display (LCD), an organic light emitting diode display (OLED), a cathode ray tube (CRT) display, a plasma display, a polarized display, or another type of display device.

Display processor 462 may be configured to cause display 460 to display stereoscopic view. There may be various techniques that display processor 462 may utilize to cause display 460 to display stereoscopic view, and aspects of this disclosure may utilize any of these techniques. For example, display processor 462 may retrieve the left-eye image from the left-half of frame buffer 452, retrieve the right-eye image from the right-half of frame buffer 452, and interleave the two images together to provide the stereoscopic view.

As another example, display processor 462 may control the refresh rate of display 460. In this example, during each refresh cycle, display processor 462 may cycle between the left-eye image and the right-eye image. For instance, display processor 462 may retrieve the left-eye image from the left-half of frame buffer 452, expand the left-eye image to the entirety of display 460, and display left-eye image on display 460 for one refresh cycle. Then, for the next refresh cycle, display processor 462 may perform substantially similar functions, but for the right-eye image stored in the right-half of frame buffer 452. In other words, display 460 may display the left-eye image, then the right-eye image, then the left-eye image, and so forth.

The viewer may be wearing specialized glasses that are synchronized with the refresh rate of display processor 462. For example, while display 460 is displaying the left-eye image, the specialized glasses may shutter close the right lens so that only the left eye of the viewer captures the left-eye image. Then, while display 460 is displaying the right-eye image, the specialized glasses may shutter close the left lens so that only the right eye of the viewer captures the right-eye image, and so forth. If the refresh rate is fast enough, the viewer perceives stereoscopic view where the image is pops out of display 460 and encompasses a 3D volume.

In some examples, some conventional display processors may not configured to cause display 460 to display stereoscopic view. In these examples, the viewer may couple device 210 to a display that includes a display processor, such as display processor 462, which is configured to cause the display to present the stereoscopic view. For example, the viewer may couple device 210 to a stereoscopic view enabled television via transceiver module 456. For instance, the viewer may couple transceiver module 456 to the television via a high-definition multimedia interface (HDMI) wire. In this example, application processor 412 or GPU 420 may instruct transceiver module 456 to transmit the pixel values stored in frame buffer 452 to the display processor of the television. The display processor of this television may then cause the television to display the left-eye and right-eye images to form the stereoscopic view.

In these examples, it may still be possible for the display of device 210 to display the left-eye and right-eye images. However, because display processor 462 of device 210 may not be able to cause display 460 of device 410 to present the stereoscopic view, in this example, display 460 may display the left-eye image and the right-eye image side-by-side. For example, the left-half of display 460 may display the left-eye image, and the right-half of display 460 may display the right-eye image. This may be because of the viewport transformation described above. In this case, even with specialized glasses, the viewer may not experience the stereoscopic view simply by viewing display 460, but would experience stereoscopic view by viewing the stereoscopic view enabled television.

Figure 5:
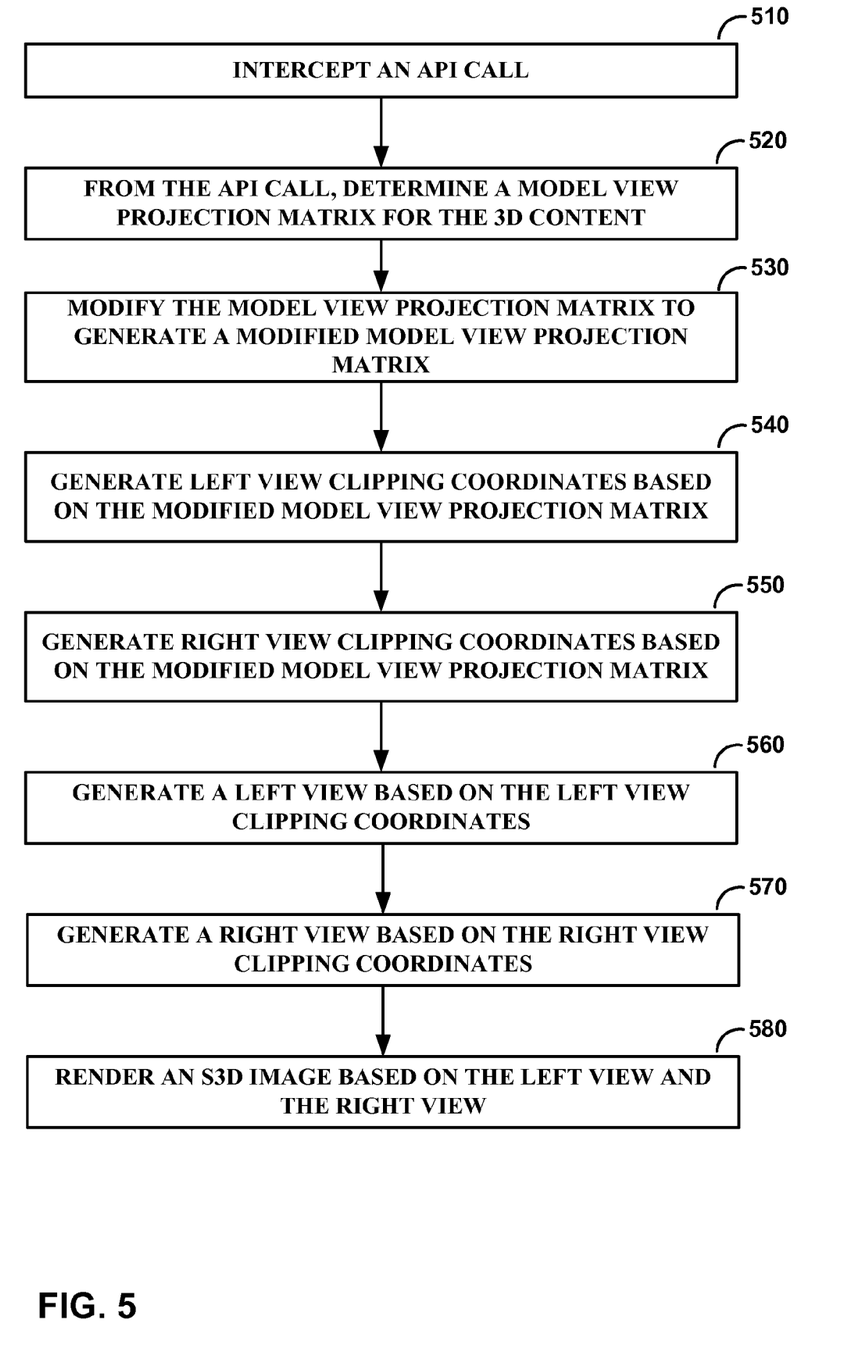
FIG. 5 is a flowchart illustrating an example operation in accordance with one or more example techniques described in this disclosure.

FIG. 5 is a flowchart illustrating an example 3D-to-S3D conversion operation in accordance with one or more example techniques described in this disclosure. As discussed above, the 3D-to-S3D conversion techniques described in this disclosure, including the techniques of FIG. 5, can be performed by a system with a GPU, such as device 210 of FIGS. 2 and 4 described above.

According to the techniques of FIG. 5, a graphics driver wrapper, such as graphics driver wrapper 214 of FIG. 2, can intercept an API call (510). The API call can, for example, be from an application configured to generate 3D graphics content (i.e. non-stereoscopic 3D content). From the API call, graphics driver wrapper 216 can determine a model view projection matrix for the 3D content (520). As described above, values for entries of the model view projection matrix can be determined even if the individual parameters used to determine those values are not specifically known. In some instances, graphics driver wrapper 216 may determine the model view projection matrix based on PRJ*MVT as described above. In other instances, however, PRJ and MVT may be unknown to graphics driver wrapper 216. Graphics driver wrapper 216 can modify the model view projection matrix to generate a modified model view projection matrix (530).

Graphics driver wrapper 216 can generate left view clipping coordinates based on the modified model view projection matrix (540). The left view clipping coordinates can be determined, for example, according to equation 6 described above, where PRJ*MVT equals MVP. Graphics driver wrapper 216 can generate right view clipping coordinates based on the modified model view projection matrix (550). The right view clipping coordinates can be determined, for example, according to equation 7 described above, where PRJ*MVT=MVP. GPU 220 can generate a left view based on the left view clipping coordinates (560), and GPU 220 can generate a right view based on the right view clipping coordinates (570). GPU 220 can render an 3D image based on the left view and the right view (580). Prior to rendering on a display, GPU 220 can apply a viewport shift to the left view and a viewport shift to the right view.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method of converting non-stereoscopic three-dimensional (3D) content to stereoscopic 3D (S3D) content, the method comprising:
   intercepting an application program interface (API) call;
   determining from the API call, a model view projection matrix for the non-stereoscopic 3D content;
   shifting the model view projection matrix to generate a first modified model view projection matrix;
   shifting the model view projection matrix to generate a second modified model view projection matrix;
   based on the first modified model view projection matrix, generating left view clipping coordinates;
   based on the second modified model view projection matrix, generating right view clipping coordinates;
   based on the left view clipping coordinates, generating a left view;
   based on the right view clipping coordinates, generating a right view, wherein a viewing direction of the left view is parallel to a viewing direction of the right view;
   based on the left view and the right view, rendering an S3D image;
   applying a first viewport shift to the left view; and,
   applying a second viewport shift to the right view.

2. The method of claim 1, wherein an amount for the viewport shift to the left view and an amount for the viewport shift to the right view are determined based on one or more user-inputted parameters.

3. The method of claim 1, wherein an amount for the viewport shift to the left view and an amount for the viewport shift to the right view are determined based on determining a depth range for scenes of previously generated images.

4. The method of claim 1, wherein shifting the model view projection matrix to generate the first modified model view projection matrix comprises adding a first constant to the model view projection matrix, and wherein shifting the model view projection matrix to generate the second modified model view projection matrix comprises adding a second constant to the model view projection matrix.

5. The method of claim 4, wherein the first constant is added to an element at a first row, fourth column of the model view projection matrix, and wherein the second constant is added to the element at the first row, fourth column of the model view projection matrix.

6. The method of claim 1, wherein the model view projection matrix is defined for the non-stereoscopic 3D content.

7. The method of claim 1, further comprising:
   receiving a system command, wherein the system command enables a mode of operation where 3D content is converted to S3D content.

8. A device comprising:
   a memory storing instructions;
   a graphics processing unit (GPU); and,
   a processor operable to, upon execution of the instructions:
   intercept an application program interface (API) call;
   determine from the API call, a model view projection matrix for non-stereoscopic 3D content;
   shift the model view projection matrix to generate a first modified model view projection matrix;
   shift the model view projection matrix to generate a second modified model view projection matrix;
   cause the GPU to generate left view clipping coordinates based on the first modified model view projection matrix;
   cause the GPU to generate right view clipping coordinates based on the second modified model view projection matrix;
   cause the GPU to generate a left view based on the left view clipping coordinates;
   cause the GPU to generate a right view based on the right view clipping coordinates, wherein a viewing direction of the left view is parallel to a viewing direction of the right view;
   cause the GPU to render a stereoscopic 3D (S3D) image based on the left view and the right view;
   cause the GPU to apply a first viewport shift to the left view and to apply a second viewport shift to the right view.

9. The device of claim 8, wherein an amount for the viewport shift to the left view and an amount for the viewport shift to the right view are determined based on one or more user-inputted parameters.

10. The device of claim 8, wherein an amount for the viewport shift to the left view and an amount for the viewport shift to the right view are determined based on determining a depth range for scenes of previously generated images.

11. The device of claim 8, wherein the processor shifts the model view projection matrix to generate the first modified model view projection matrix by adding a first constant to the model view projection matrix, and wherein the processor shifts the model view projection matrix to generate the second modified model view projection matrix by adding a second constant to the model view projection matrix.

12. The device of claim 11, wherein the first constant is added to an element at a first row, fourth column of the model view projection matrix, and wherein the second constant is added to an element at a first row, fourth column of the model view projection matrix.

13. The device of claim 8, wherein the model view projection matrix is defined for the non-stereoscopic 3D content.

14. The device of claim 8, wherein the processor is further operable to:
receive a system command, wherein the system command enables a mode of operation where 3D content is converted to S3D content.

15. An apparatus for converting non-stereoscopic three-dimensional (3D) content to stereoscopic 3D (S3D) content, the apparatus comprising:
means for intercepting an application program interface (API) call;
means for determining from the API call, a model view projection matrix for the non-stereoscopic 3D content;
means for shifting the model view projection matrix to generate a first modified model view projection matrix;
means for shifting the model view projection matrix to generate a second modified model view projection matrix;
means for generating left view clipping coordinates based on the first modified model view projection matrix;
means for generating right view clipping coordinates based on the second modified model view projection matrix;
means for generating a left view based on the left view clipping coordinates;
means for generating a right view based on the right view clipping coordinates, wherein a viewing direction of the left view is parallel to a viewing direction of the right view;
means for rendering an S3D image based on the left view and the right view;
means for applying a first viewport shift to the left view; and,
means for applying a second viewport shift to the right view.

16. The apparatus of claim 15, wherein an amount for the viewport shift to the left view and an amount for the viewport shift to the right view are determined based on one or more user-inputted parameters.

17. The apparatus of claim 15, wherein an amount for the viewport shift to the left view and an amount for the viewport shift to the right view are determined based on determining a depth range for scenes of previously generated images.

18. The apparatus of claim 15, wherein the means for shifting the model view projection matrix to generate the first modified model view projection matrix comprises means for adding a first constant to the model view projection matrix, and wherein the means for shifting the model view projection matrix to generate the second modified model view projection matrix comprise means for adding a second constant to the model view projection matrix.

19. The apparatus of claim 18, wherein the means for adding the constant adds the first constant to an element at a first row, fourth column of the model view projection matrix, and adds the second constant to the element at the first row, fourth column of the model view projection matrix.

20. The apparatus of claim 15, wherein the model view projection matrix is defined for the non-stereoscopic 3D content.

21. The apparatus of claim 15, further comprising:
means for receiving a system command, wherein the system command enables a mode of operation where 3D content is converted to S3D content.

22. A non-transitory computer-readable storage medium having stored thereon instructions that when executed cause one or more processors to:
intercept an application program interface (API) call;
determine from the API call, a model view projection matrix for the non-stereoscopic 3D content;
shift the model view projection matrix to generate a first modified model view projection matrix;
shift the model view projection matrix to generate a second modified model view projection matrix;
based on the first modified model view projection matrix, generate left view clipping coordinates;
based on the second modified model view projection matrix, generate right view clipping coordinates;
based on the left view clipping coordinates, generate a left view;
based on the right view clipping coordinates, generate a right view;
based on the left view and the right view, render a stereoscopic 3D (S3D) image;
apply a first viewport shift to the left view; and,
apply a second viewport shift to the right view.

23. The non-transitory computer-readable storage medium of claim 22, wherein an amount for the viewport shift to the left view and an amount for the viewport shift to the right view are determined based on one or more user-inputted parameters.

24. The non-transitory computer-readable storage medium of claim 22, wherein an amount for the viewport shift to the left view and an amount for the viewport shift to the right view are determined based on determining a depth range for scenes of previously generated images.

25. The non-transitory computer-readable storage medium of claim 20, wherein the one or more processors shift the model view projection matrix by adding a first constant to the model view projection matrix, and shift the model view projection matrix by adding a second constant to the model view projection matrix.

26. The non-transitory computer-readable storage medium of claim 25, wherein the first constant is added to an element at a first row, fourth column of the model view projection matrix, and wherein the second constant is added to the element at the first row, fourth column of the model view projection matrix.

27. The non-transitory computer-readable storage medium of claim 22, wherein the model view projection matrix is defined for the non-stereoscopic 3D content.

28. The non-transitory computer-readable storage medium of claim 22 having stored thereon further instructions that when executed cause the one or more processors to:
receive a system command, wherein the system command enables a mode of operation where 3D content is converted to S3D content.

* * * * *